US012574707B2

(12) United States Patent     (10) Patent No.:   US 12,574,707 B2

Xu et al.     (45) Date of Patent:    Mar. 10, 2026

(54) METHODS, ENTITIES, APPLICATION SERVER AND COMPUTER READABLE MEDIA FOR LOCAL MBMS BASED MBMS DATA DELIVERY

(71) Applicant: Telefonaktiebolaget LM Ericsson (publ), Stockholm (SE)

(72) Inventors: Wenliang Xu, Shanghai (CN); Ali El Essaili, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 376 days.

(21) Appl. No.: 18/022,892

(22) PCT Filed: Jun. 22, 2021

(86) PCT No.: PCT/CN2021/101454

§ 371 (c)(1),
(2) Date: Feb. 23, 2023

(87) PCT Pub. No.: WO2022/041976

PCT Pub. Date: Mar. 3, 2022

(65) Prior Publication Data

US 2023/0308839 A1     Sep. 28, 2023

(51) Int. Cl.
H04W 28/02     (2009.01)
H04W 4/06     (2009.01)
H04W 76/40     (2018.01)

(52) U.S. Cl.
CPC ............. H04W 4/06 (2013.01); H04W 76/40 (2018.02)

(58) Field of Classification Search
CPC ........... H04L 12/1863; H04L 65/1063; H04W 76/19; H04W 76/40; H04W 4/06; H04W 36/0016; H04W 4/08
See application file for complete search history.

(56) References Cited

U.S. PATENT DOCUMENTS

| 2007/0293249 A1 | 12/2007 | Wang |
| 2019/0028855 A1 | 1/2019 | Yang et al. |
| 2020/0178052 A1 | 6/2020 | Pattan et al. |
| (Continued) | | |

FOREIGN PATENT DOCUMENTS

| CN | 1956450 A | 5/2007 |
| CN | 100454819 C | 1/2009 |
| CN | 107041016 A | 8/2017 |

OTHER PUBLICATIONS

CATT, "Pseudo-CR on solution for the support of local MBMS", 3GPP TSG-SA WG6 Meeting #38-e, e-meeting, S6-201131, Jul. 31, 2020 (4 pages).

(Continued)

*Primary Examiner* — Phuoc H Doan
(74) *Attorney, Agent, or Firm* — Rothwell, Figg, Ernst & Manbeck, P.C.

(57)     ABSTRACT

Methods, entities, application server, and computer readable media for local MBMS. The method at a requesting entity includes: generating a request message that comprises an indication of using local MBMS information configured in an executing entity (S401); and transmitting the request message to the executing entity (S403), wherein the requesting entity and the executing entity are comprised in an application server.

24 Claims, 8 Drawing Sheets

500

S501

Configuring At Least One Piece Of Local MBMS Information

S503

Receiving, From A Requesting Entity, A Request Message That Comprises An Indication Of Using Local MBMS Information Configured In The Executing Entity

(56) References Cited

U.S. PATENT DOCUMENTS

2020/0389772 A1* 12/2020 Szilagyi .................. H04W 4/06

OTHER PUBLICATIONS

International Search Report and Written Opinion issued in International Application No. PCT/CN2021/101454 dated Sep. 27, 2021 (8 pages).
International Preliminary Report on Patentability issued in International Application No. PCT/CN2021/101454 dated Dec. 15, 2022 (7 pages).
3GPP TS 23.285 V16.3.0 (Jul. 2020), 3rd Generation Partnership Project; Technical Specification Group Services and System Aspects; Architecture enhancements for V2X services (Release 16), Jul. 2020 (38 pages).
3GPP TS 23.286 V16.3.0 (Mar. 2020), 3rd Generation Partnership Project; Technical Specification Group Services and System Aspects; Application layer support for Vehicle-to-Everything (V2X) services; Functional architecture and information flows; (Release 16), Mar. 2020 (64 pages).
3GPP TR 23.764 V1.1.1 (Aug. 2020), 3rd Generation Partnership Project; Technical Specification Group Services and System Aspects; Study on enhancements to application layer support for V2X services; (Release 17), Aug. 2020 (50 pages).
3GPP TS 23.434 V16.4.0 (Jul. 2020), 3rd Generation Partnership Project; Technical Specification Group Services and System Aspects; Service Enabler Architecture Layer for Verticals (SEAL); Functional architecture and information flows; (Release 16), Jul. 2020 (120 pages).
3GPP TS 29.468 V14.3.0 (Dec. 2017) (39 pages).

* cited by examiner

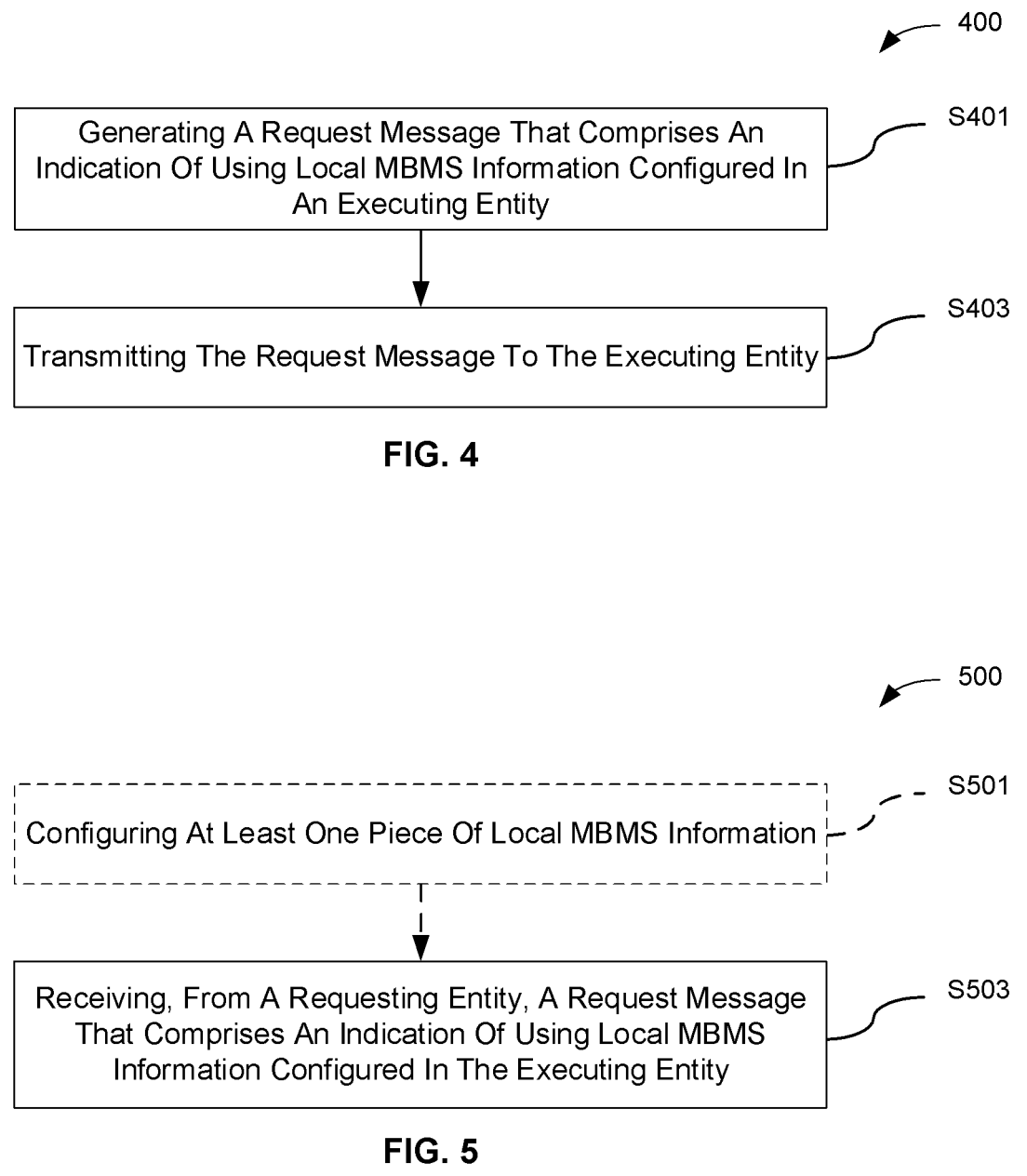

400

S401

Generating A Request Message That Comprises An Indication Of Using Local MBMS Information Configured In An Executing Entity

S403

Transmitting The Request Message To The Executing Entity

Configuring At Least One Piece Of Local MBMS Information

S503

Receiving, From A Requesting Entity, A Request Message That Comprises An Indication Of Using Local MBMS Information Configured In The Executing Entity

FIG. 5

Requesting Entity 800

Requesting Entity <u>900</u>

Executing Entity <u>1000</u>

Executing Entity　1100

Application Server　1200

METHODS, ENTITIES, APPLICATION SERVER AND COMPUTER READABLE MEDIA FOR LOCAL MBMS BASED MBMS DATA DELIVERY

CROSS REFERENCE TO RELATED APPLICATIONS

This application is a 35 U.S.C. § 371 National Stage of International Patent Application No. PCT/CN2021/101454, filed 2021 Jun. 22, which claims priority to PCT/CN2020/111484, filed on 2020 Aug. 26. The above identified applications are incorporated by this reference.

TECHNICAL FIELD

The present disclosure generally relates to the technical field of communication technologies, and particularly to methods, entities, an application server and computer readable media for local Multimedia Broadcast Multicast Service (MBMS) based MBMS data delivery.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Local MBMS was introduced in 3rd generation partnership project (3GPP) TS 23.285 ("Architecture enhancements for V2X services") v16.3.0 for the purpose of MBMS latency improvements, which is incorporated by reference herein in its entirety. 3GPP TS 23.285 v16.3.0 provides some exemplary local MBMS deployments in Vehicle-to-Everything (V2X) communications in Long-Term Evolution (LTE) as respectively shown in FIGS. 1 and 2. For the localized MBMS core network (CN) functions (or its user plane), the MBMS gateway (GW) and the Broadcast Multicast-Service Center (BM-SC) (or its user plane) are deployed close to the Radio Access Network (RAN), such as Evolved Universal Terrestrial Radio Access Network (E-UTRAN) in this example.

It should be understood that the "Local MBMS" (also abbreviated as L.MBMS) throughout the specification refers to local MBMS based MBMS data delivery, and may be interchanged with each other.

Although in both FIG. 1 and FIG. 2, MB2 interfaces (including MB2-C and MB2-U interfaces) are shown between the BM-SC and the V2X application server (AS), it should be understood that the same local MBMS deployments may also be applied for the xMB interfaces (including xMB-C and xMB-U interfaces) between the BM-SC and the V2X AS. Furthermore, it should be understood that the exemplary local MBMS deployments may also be applied in the fifth generation system (5GS) architecture, with appropriate replacement of some network elements in LTE with those in 5GS, although not shown herein. For example, for the 5GS architecture, the MME in FIGS. 1 and 2 may be replaced with e.g., Access and mobility Function (AMF), the Serving Gateway (S-GW) and Packet Data Network Gateway (P-GW) may be replaced with e.g., Session Management Function (SMF), the BM-SC may be replaced with e.g., a CN entity, the E-UTRAN may be replaced with e.g. gNB, etc.

3GPP TS 23.286 ("Application layer support for V2X services; Functional architecture and information flows") v16.3.0, which is incorporated by reference herein in its entirety, defines a V2X application layer model for V2X communications over PC5 and Uu, which is shown in FIG. 3. In the V2X application layer model, the V2X application enabler (VAE) layer provides support information to the V2X application.

As shown in FIG. 3, the V2X UE1 communicates with the V2X application server over the V1 reference point. The V2X UE1 and V2X UE2 communicate over the V5 reference point. The V2X UE1 can also act as a UE-to-network relay, to enable the V2X UE2 to access the V2X application server over the V1 reference point.

The V2X application layer functional entities for the V2X UE (e.g., V2X UE1, V2X UE2) and the V2X application server are grouped into the V2X application specific layer and the VAE layer. The VAE layer offers the VAE capabilities to the V2X application specific layer. The V2X application layer functional model utilizes Service Enabler Architecture Layer for Verticals (SEAL) services as specified in 3GPP TS 23.434 ("Service Enabler Architecture Layer for Verticals; Functional architecture and information flows") v16.4.0, which is incorporated by reference herein in its entirety.

SEAL is applicable to vertical applications using E-UTRAN or New Radio (NR) access based on the Evolved Packet Core (EPC) or fifth generation system (5GS) architecture as defined in 3GPP TS 23.401 V16.7.0 and 3GPP TS 23.501 V16.5.1, the disclosures of which are incorporated herein by reference in its entirety. The SEAL services may ensure efficient use and deployment of vertical applications over the 3GPP system.

The VAE server is located in the VAE layer. The SEAL services utilized by VAE layer are location management, group management, configuration management, identity management, key management and network resource management. The V2X application specific layer consists of the V2X application specific functionalities.

The V2X application server consists of the VAE server, the SEAL servers and the V2X application specific server. The VAE server provides the V2X application layer support functions to the V2X application specific server over the Vs reference point.

The V2X UEs consist of the VAE client, the SEAL clients and the V2X application specific client. The VAE client provides the V2X application layer support functions to the V2X application specific client over the Vc reference point.

In some exemplary deployments, the client and server entities of SEAL can be part of the VAE client and the VAE server respectively.

The VAE client acts as a Vertical Application Layer (VAL) client for its interaction with the SEAL clients as specified in 3GPP TS 23.434 v16.4.0. The VAE server acts as a VAL server for its interaction with the SEAL servers as specified in 3GPP TS 23.434 v16.4.0.

In the VAE layer, the VAE client communicates with the VAE server over the V1-AE reference point. In the V2X application specific layer, the V2X application specific client communicates with the V2X application specific server over the V1-APP reference point.

In the VAE layer, the VAE client of the V2X UE2 communicates with the VAE client of the V2X UE1 over the V5-AE reference point. In the V2X application specific layer, the V2X application specific client of the V2X UE2 communicates with the VAE client of the V2X UE1 over the V5-APP reference point.

At least the following exemplary SEAL services for V2X applications are supported:

Location management as specified in 3GPP TS 23.434 v16.4.0;

Group management as specified in 3GPP TS 23.434 v16.4.0;

Configuration management as specified in 3GPP TS 23.434 v16.4.0;

Identity management as specified in 3GPP TS 23.434 v16.4.0;

Key management as specified in 3GPP TS 23.434 v16.4.0; and

Network resource management (NRM) as specified in 3GPP TS 23.434 v16.4.0.

Accordingly, the SEAL server may have different servers for providing the above different services respectively, which may include e.g., a location management server, a group management server, a configuration management server, an identity management server, a key management server, an NRM server etc.

The VAE client interacts with the SEAL clients over the SEAL-C reference point specified for each SEAL service. The VAE server interacts with the SEAL servers over the SEAL-S reference point specified for each SEAL service. The interaction between the SEAL clients is supported by the SEAL-PC5 reference point specified for each SEAL service. The interaction between a SEAL client and the corresponding SEAL server is supported by the SEAL-UU reference point specified for each SEAL service.

The SEAL-C, SEAL-S, SEAL-PC5, and SEAL-UU reference points for each SEAL service are specified in 3GPP TS 23.434 v16.4.0.

To support distributed VAE server deployments, the VAE server interacts with another VAE server over the VAE-E reference point.

The V2X UE1 can also act as a UE-to-network relay, to enable the VAE client on V2X UE2 to access the VAE server over the V1-AE reference point; and to enable the V2X application specific client on the V2X UE2 to access the V2X application specific server over the V1-APP reference point.

A V1-AE message can be sent over unicast, transparent multicast via xMB, transparent multicast via MB2. The non-transparent multicast via xMB is triggered by a V1-AE message. Multicast distribution can be supported by both transparent and non-transparent multicast modes.

The VAE server interacts with the 3GPP network system over e.g., the V2, MB2, xMB, Rx and T8 reference points.

Dynamic group creation is defined in 3GPP TS 23.286 v16.3.0. In some cases, the V2X UEs are required to be determined dynamically during operation, for scenarios such as platooning. In this case, dynamic groups are established, and the group parameters need to be updated dynamically and communicated between the V2X application server and the V2X UEs.

Local MBMS Support

As previously described, the local MBMS was introduced in 3GPP TS 23.285 v16.3.0 for the purpose of MBMS latency improvements. To support the local MBMS, the V2X application server can provide the transport network level information and MB2-U/xMB-U interface information to the BM-SC (see subclause 5.4.2.2 of 3GPP TS 23.285 v16.3.0). In the current V2X application layer functional model, the NRM server, as part of SEAL functionalities, provides control plane interface (MB2-C/xMB-C), and the VAE server, acting as a VAL server, provides user plane interface (MB2-U/xMB-U) towards the BM-SC that is configured as a part of 3GPP CN entity.

3GPP TR 23.764 ("Study on enhancements to application layer support for V2X services") v1.1.1, which is incorporated by reference herein in its entirety, has introduced a key issue (KI) 14 on support for local MBMS in clause 5.14, which has proposed that the following aspects need to be studied:

In the local MBMS deployment scenarios, which entity (VAE server or NRM server) makes the decision to use local MBMS, and which entity provides relevant configurations (e.g. MB2-U address) to the BM-SC?

Whether and how the configurations and the usage of the local MBMS functions and the normal MBMS functions need to coordinate at the V2X application layer?

For this purpose, 3GPP TR 23.764 v1.1.1 has introduced Solution #13 for support for local MBMS in clause 7.13.

Solution #13 may resolve the above key issue 14, i.e., support for local MBMS.

In particular, Solution #13 has proposed that some local MBMS parameters are added (shown as underlined text in Table 1 below) in the information flow for the MBMS bearers request from the VAL server (e.g. the VAE Server) to the NRM server, as defined in clause 14.3.2.10 of 3GPP TS 23.434 v16.4.0.

Table 1 (corresponding to Table 14.3.2.10-1 in clause 14.3.2.10 of 3GPP TS 23.434 v16.4.0) describes an information flow for MBMS bearers request from the VAL server to the NRM server.

TABLE 1

| MBMS Bearers Request | | |
| --- | --- | --- |
| Information element | Status | Description |
| Requester Identity | M | The identity of the VAL server performing the request. |
| VAL group ID | M | The identity of the group that the MBMS bearer is requested for. |
| Service announcement mode | M | Indicates whether the request is sent by NRM server or by the VAL server |
| QoS | M | Indicates the requested QoS for the bearer |
| Broadcast area | O | Indicate the area where the MBMS bearer is requested for |
| Endpoint information | M | Information of the endpoint of the VAL server to which the user plane notifications have to be sent. |
| Local MBMS information | O | |
| > MB2-U information | O | IP address, UDP port number of the MB2-U interface |
| > xMB-U information | O | IP address, UDP port number of the xMB-U interface |
| > M1 interface information | O | M1 interface information for local MBMS |

The MBMS bearers request proposed in Solution #13 of 3GPP TR 23.764 v1.1.1 supports the pre-established MBMS bearers in local MBMS operation.

Solution #13 allows the VAL server to provide the local MBMS information to the NRM server in the SEAL layer. In Solution #13, it is the VAL server (e.g., the VAE server) that makes decision to use local MBMS, and it is also the VAL server (e.g., the VAE server) that provides the relevant configuration to the BM-SC.

However, Solution #13 cannot provide an easy way for the VAL server (e.g., the VAE server) to use the service API provided by the underlying supporting server (e.g., the NRM server).

In addition, for the V2X service, there exists file distribution capability provided by the VAE server in clauses 4.4 and 9.5 of 3GPP TS 23.286 v16.3.0, which utilizes the MBMS file delivery function over xMB.

However, the interactions between the V2X application specific server and the VAE server are performed without taking the local MBMS delivery into consideration.

SUMMARY

In order to solve or at least alleviate the above problems in the conventional technical solutions, the present disclosure provides a technical solution of the VAL server, acting as a requesting entity, requesting to use local MBMS information that is pre-configured in the NRM server acting as an executing entity. Thus, in the technical solution of the present disclosure, it is still the VAL server that makes decision to use local MBMS, but the relevant configuration is provided by the NRM server. That is, the VAL server that makes decision to use local MBMS is allowed to use the local MBMS information configured in the NRM server, i.e., to use the service API provided by the NRM server, to activate the MBMS bearer. And such a technical solution is applicable for both the pre-established and dynamically established MBMS bearer.

In addition, in the technical solution of the present disclosure, the local MBMS configuration in the NRM server may take the VAL service ID into consideration when deciding to activate the MBMS bearer.

Furthermore, the present disclosure also provides a technical solution of enhancing file delivery related interactions between the V2X application specific server and the VAE server by taking local MBMS delivery into consideration.

According to a first aspect of the present disclosure, a method at a requesting entity. The method includes: generating a request message that includes an indication of using local MBMS information configured in an executing entity; and transmitting the request message to the executing entity, wherein the requesting entity and the executing entity are included in an application server.

In an exemplary embodiment, at least one piece of local MBMS information is configured in the executing entity.

In an exemplary embodiment, the requesting entity is a VAL server, and the executing entity is an NRM server; and the request message is a message for requesting an MBMS bearer that is transmitted from the VAL server to the NRM server via an API provided by the NRM sever.

In an exemplary embodiment, the request message further includes at least one of:

a VAL service ID indicating a VAL service identifier that the MBMS bearer is requested for, a requester ID indicating an identity of the VAL server that transmits the message, or a VAL group ID indicating an identity of a group that the MBMS bearer is requested for.

In an exemplary embodiment, the local MBMS information is selected from the at least one piece of local MBMS information according to at least one of: the VAL service ID, requester ID, and the VAL group ID.

In an exemplary embodiment, the local MBMS information includes at least one of:

MB2-U information, xMB-U information, or

M1 interface information.

In an exemplary embodiment, the requesting entity is an application specific server, and the executing entity is a VAL server; and the request message is a message for requesting file distribution that is transmitted from the application specific server to the VAL server via an Application Programming Interface (API) provided by the VAL server.

In an exemplary embodiment, the VAL server includes a VAE server.

In an exemplary embodiment, the indication is replaced with local MBMS information configured in the application specific server.

In an exemplary embodiment, the local MBMS information includes at least one of:

xMB-U information, or

M1 interface information.

According to a second aspect of the present disclosure, a method at an executing entity is provided. The method includes: receiving, from a requesting entity, a request message that includes an indication of using local MBMS information configured in the executing entity.

In an exemplary embodiment, the method further includes: configuring at least one piece of local MBMS information.

In an exemplary embodiment, the requesting entity is a VAL server, and the executing entity is an NRM server; and the request message is a message for requesting an MBMS bearer that is received from the NRM server to the VAL server via an API.

In an exemplary embodiment, the request message further includes at least one of:

a VAL service ID indicating a VAL service identifier that the MBMS bearer is requested for, a requester ID indicating an identity of the VAL server that transmits the message, or a VAL group ID indicating an identity of a group that the MBMS bearer is requested for.

In an exemplary embodiment, the method further includes: selecting the local MBMS information from the at least one piece of local MBMS information according to at least one of: the VAL service ID, requester ID, and the VAL group ID; and using the selected local MBMS information for activating an MBMS bearer.

In an exemplary embodiment, the local MBMS information includes at least one of:

MB2-U information, xMB-U information, or

M1 interface information.

In an exemplary embodiment, the requesting entity is an application specific server, and the executing entity is a VAL server; and the request message is a message for requesting file distribution that is transmitted from the application specific server to the VAL server via an API provided by the VAL server.

In an exemplary embodiment, the VAL server includes a VAE server.

In an exemplary embodiment, the indication is replaced with local MBMS information configured in the application specific server, and the method further includes: using the received local MBMS information for file distribution.

In an exemplary embodiment, the local MBMS information includes at least one of:

xMB-U information, or

M1 interface information.

According to a third aspect of the present disclosure, a requesting entity is provided. The requesting entity includes: at least one processor, and at least one memory, storing instructions which, when executed on the at least one processor, cause the requesting entity to perform any of the methods according to the first aspect of the present disclosure.

According to a fourth aspect of the present disclosure, an executing entity is provided. The executing entity includes: at least one processor, and at least one memory, storing instructions which, when executed on the at least one processor, cause the executing entity to perform any of the methods according to the second aspect of the present disclosure.

According to a fifth aspect of the present disclosure, an application server is provided. The application server includes: at least one requesting entity according to the third aspect of the present disclosure, and at least one executing entity according to the fourth aspect of the present disclosure.

According to a sixth aspect of the present disclosure, a computer readable storage medium is provided. The computer readable storage medium has computer program instructions stored thereon, the computer program instructions, when executed by at least one processor, causing the at least one processor to perform the method according to any of the first and second aspects of the present disclosure.

The technical solutions of the present disclosure may achieve at least benefits of allowing using local MBMS configuration at the NRM server and providing local MBMS support for file distribution.

BRIEF DESCRIPTION OF THE DRAWINGS

The objects, advantages and characteristics of the present disclosure will be more apparent, according to descriptions of preferred embodiments in connection with the drawings, in which:

FIG. 4 schematically shows a method at a requesting entity for local MBMS based MBMS data delivery according to an exemplary embodiment of the present disclosure;

FIG. 5 schematically shows a method at an executing entity for local MBMS based MBMS data delivery according to an exemplary embodiment of the present disclosure;

Figure 1:
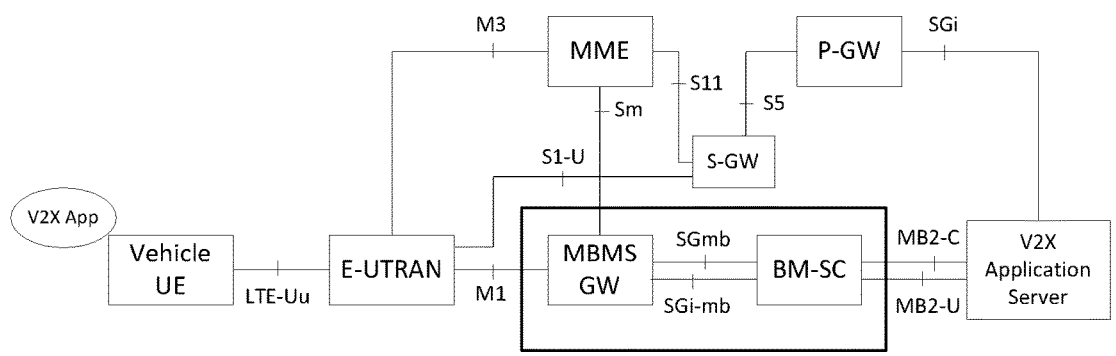
FIG. 1 schematically shows an exemplary MBMS deployment with localized MBMS CN functions.
Figure 2:
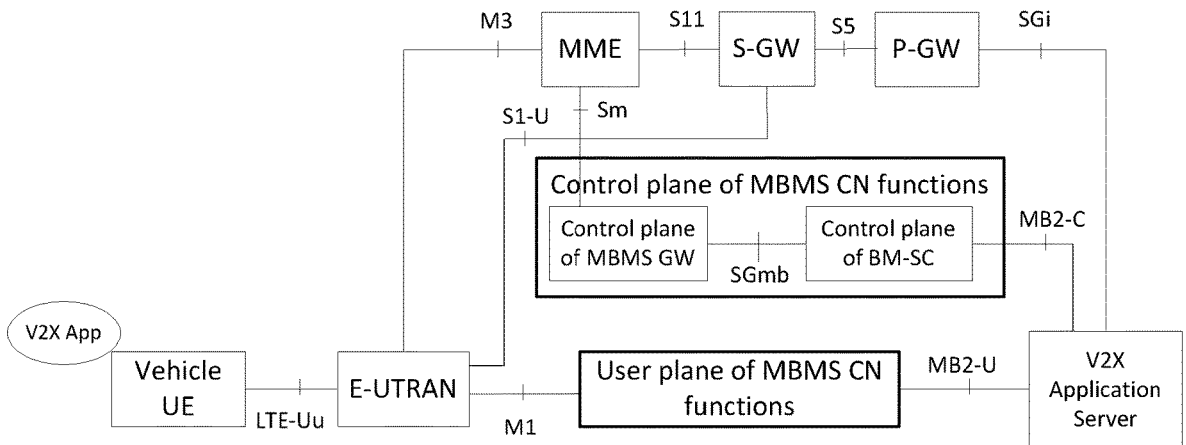
FIG. 2 schematically shows an exemplary MBMS deployment with localized user plane of MBMS CN functions.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

As used herein, the term "network" refers to a network following any suitable (wireless or wired) communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably.

Furthermore, the communications between two devices in the network may be performed according to any suitable communication protocols, including, but not limited to, the wireless communication protocols as defined by a standard organization such as 3GPP or the wired communication protocols. For example, the wireless communication protocols may comprise the first generation (1G), 2G, 3G, 4G, 4.5G, 5G communication protocols, and/or any other protocols either currently known or to be developed in the future.

The term "entity" or "network entity" used herein refers to a network device or network node or network function in a communication network, and may also refer to a virtualized entity that may be implemented on cloud. For example, in a wireless communication network such as a 3GPP-type cellular network, a core network device may offer numerous services to customers who are interconnected by an access network device. Each access network device is connectable to the core network device over a wired or wireless connection.

The term "CN entity" refers to any suitable function which can be implemented in a network entity (physical or virtual) of a communication network. For example, a network entity can be implemented either as a network element on a dedicated hardware, as a software instance running on a dedicated hardware, or as a virtualized function instantiated on an appropriate platform, e.g. on a cloud infrastructure. For example, the 5G Core Network system (5GC) may comprise a plurality of functions such as AMF, SMF, UDM (Unified Data Management), PCF (Policy Control Function), UPF (User plane Function), NRF (Network Repository Function), etc. For example, the 4G Core Network system (such as EPC) may include MME, HSS (home subscriber server), P-GW, BM-SC, etc. In other embodiments, the CN entity may comprise different types of functions for example depending on the specific network.

The basic ideas of the present disclosure mainly consist in that
  local MBMS configuration is provided, i.e., local MBMS information is configured, in the NRM server (as a common enabler layer) in the SLAM layer;
  the VAL server, acting as a requesting entity, requests to use local MBMS information that is configured in the NRM server acting as an executing entity, so that the VAL server makes decision to use local MBMS, but the relevant configuration is provided by the NRM server;
  the local MBMS configuration in the NRM server may take the VAL service ID into consideration when deciding to activate the pre-established or dynamically established MBMS bearer; and
  local MBMS support is provided for file distribution.

Hereinafter, a method 400 at a requesting entity for local MBMS based MBMS data delivery according to an exemplary embodiment of the present disclosure will be described with reference to FIG. 4. It should be understood that the requesting entity may be any node that can be configured to perform the method 400 as described below, including a virtualized entity that may be implemented on cloud. It should be understood that the method 400 may be appropriately applied in LTE, 5GS, or other future developments.

As previously described, the "local MBMS" (also abbreviated as L.MBMS) throughout the specification refers to local MBMS based MBMS data delivery, and may be interchanged with each other. In the present disclosure, the local MBMS based MBMS data delivery may include delivery of files, V2X messages or any other possible form of data.

As shown in FIG. 4, the method 400 includes steps S401 and S403.

In step S401, the requesting entity generates a request message that includes an indication of using local MBMS information configured in an executing entity.

Then in step S403, the requesting entity transmits the request message to the executing entity.

Here, the requesting entity and the executing entity may be included in the same application server or distributed. The application server in the present disclosure may be any appropriate application server providing related application services, e.g., a V2X application server as previously described with reference to FIG. 3 that provides V2X related service, a Unmanned Aerial Vehicle (UAV) server that provides UAV related service, a power station server that provides power station related service, a water meter server that provides water meter related service, etc.

In an exemplary embodiment, at least one piece of local MBMS information is configured in the executing entity by its corresponding service provider, e.g., by an operator that provides the executing entity, or by a third party that provides the executing entity according to agreements between the third party and the operator.

In an exemplary embodiment, the requesting entity may be a VAL server, and the executing entity may be an NRM server. In this exemplary embodiment, the method 400 may be applied to the exemplary signaling sequence diagram of a VAL service communication procedure over an MBMS bearer as respectively shown in FIG. 6a and FIG. 6b, which will be described in detail later.

The VAL server may be represented by any appropriate application enabler server located in a related application enabler layer, and the NRM server is a part of the SEAL server. As previously described, the SEAL server includes a plurality of servers that are located in the SEAL layer for providing different services respectively, which may include e.g., a location management server, a group management server, a configuration management server, an identity management server, a key management server, an NRM server etc.

The VAL server may be any appropriate application enabler server or application specific server. Both of the application enabler server and the application specific server may be regarded as a SEAL consumer of the SEAL server, from the SEAL server's perspective.

Figure 3:
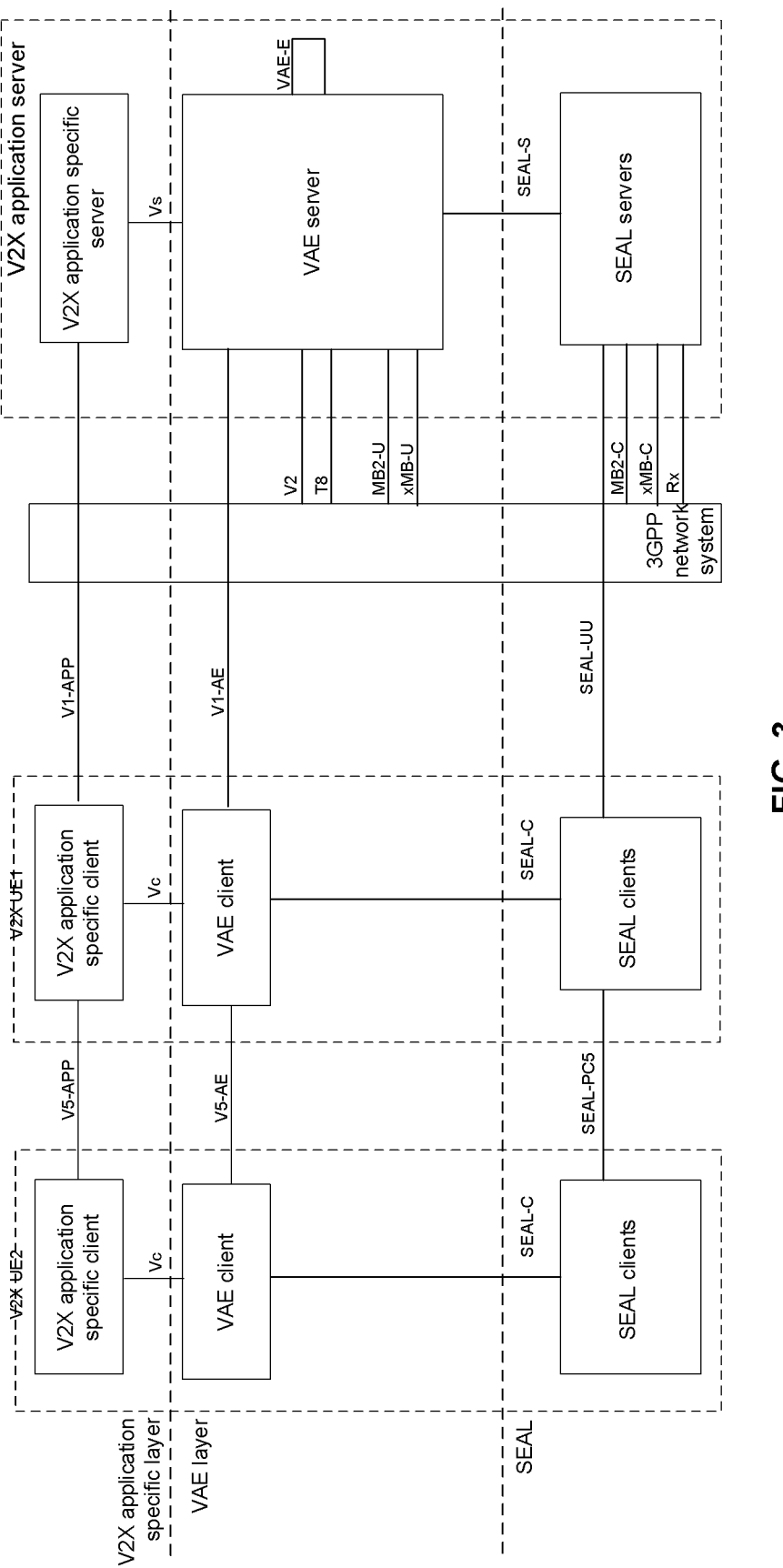
FIG. 3 schematically shows an exemplary V2X application layer model for V2X communications.

In connection with the exemplary architecture as shown in FIG. 3, the VAL server may be exemplarily represented by the VAE server located in the VAE layer. From the NRM server's perspective, the VAL server may be the VAE server or the V2X application specific server.

In this exemplary embodiment, the request message is a message for requesting an MBMS bearer, e.g., an MBMS Bearers Request message, that is transmitted from the VAL server to the NRM server via an API provided by the NRM sever, e.g., an SS_NetworkResourceAdaptation API.

Preferably, the request message may further includes at least one of:

a VAL service ID indicating a VAL service identifier that the MBMS bearer is requested for;

a requester ID indicating an identity of the VAL server that transmits the message, or a VAL group ID indicating an identity of a group that the MBMS bearer is requested for.

Accordingly, the local MBMS information may be selected by the NRM server from the at least one piece of local MBMS information according to at least one of: the VAL service ID, requester ID, and the VAL group ID included in the request message that is received from the VAL server.

3GPP TS 23.434 v16.4.0 has described the VAL service ID in clause 7.4 which may be used for policy mapping, QoS handling and so on. In the context of V2X service, an Intelligent Transport Systems-Application Object Identifier (ITS-AID) or Provider Service ID (PSID) may be used as a V2X service ID. Preferably, the local MBMS information configured in the NRM server may take the VAL service ID into consideration when deciding to activate the MBMS bearer, since the VAL service ID is useful to make the NRM server to select the relevant local MBMS information.

In an exemplary embodiment, the local MBMS information may include at least one of:

MB2-U information, xMB-U information, or

M1 interface information.

The MB2-U information may include e.g., an IP address, a User Datagram Protocol (UDP) port number of the MB2-U interface. The xMB-U information may include e.g., an IP address, a UDP port number of the xMB-U interface. The M1 interface information may include e.g., M1 interface information for local MBMS.

Figure 7:
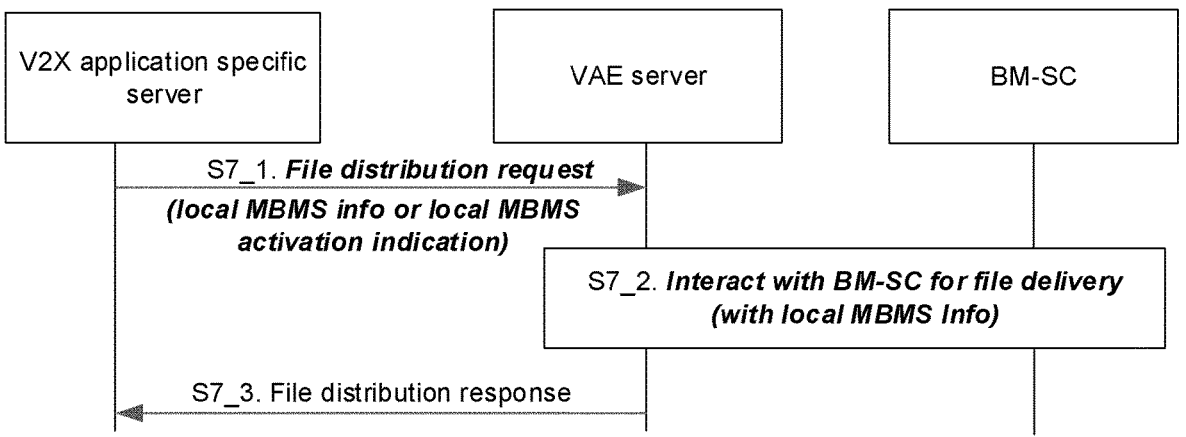
FIG. 7 schematically shows an exemplary signaling sequence diagram of a file delivery procedure over an MBMS bearer, in which methods for local MBMS based MBMS data delivery according to exemplary embodiments of the present disclosure are applied.

In another exemplary embodiment, the requesting entity may be an application specific server, and the executing entity may be a VAL server. In this exemplary embodiment, the method 400 may be applied to the exemplary signaling sequence diagram of a file delivery procedure over an MBMS bearer as shown in FIG. 7, which will be described in detail later.

The VAL server may be represented by any appropriate application enabler server located in a related application enabler layer, and the application specific server may be any appropriate application specific server located in a related application specific layer, which interacts with the VAL server. In connection with the exemplary architecture as shown in FIG. 3, the VAL server may be exemplarily represented by the VAE server located in the VAE layer, and the application specific server may be e.g., the V2X application specific server.

In this exemplary embodiment, the request message is a message for requesting file distribution, e.g., a File Distribution Request message, that is transmitted from the application specific server to the VAL server via an API provided by the VAL server, e.g., a VAE_FileDistribution API.

In an exemplary embodiment, the indication may be replaced with local MBMS information configured in the application specific server.

That is, the request message from the application specific server to the VAL server may include either local MBMS information configured in the application specific server or an indication of using local MBMS information configured in the VAL server.

Thus, the application specific server may transmit the local MBMS information configured in the application specific server directly in the message for requesting file distribution to the VAL server for the VAL server to use the local MBMS information for file distribution.

Alternatively, the application specific server may also transmit the indication of using local MBMS information configured in the VAL server in the message for requesting file distribution to the VAL server, so that the VAL server may use the local MBMS information configured by itself for file distribution.

In an exemplary embodiment, the local MBMS information includes at least one of:

xMB-U information, or

M1 interface information.

The xMB-U information may include e.g., an IP address, a UDP port number of the xMB-U interface, and the M1 interface information may include e.g., M1 interface information for local MBMS.

Hereinafter, a method 500 at an executing entity for local MBMS based MBMS data delivery according to an exemplary embodiment of the present disclosure will be described with reference to FIG. 5. It should be understood that the executing entity may be any node that can be configured to perform the method 500 as described below, including a virtualized entity that may be implemented on cloud. It should be understood that the method 500 may be appropriately applied in LTE, 5GS, or other future developments.

The method 500 at the executing entity corresponds to the method 400 at the requesting entity. Thus, some description of the method 500 may refer to that of method 400, and thus will be omitted for simplicity.

As shown in FIG. 5, the method 500 includes step S503.

In step S503, the executing entity receives, from a requesting entity, a request message that includes an indication of using local MBMS information configured in the executing entity.

Here, the requesting entity and the executing entity may be included in the same application server or distributed.

In an exemplary embodiment, at least one piece of local MBMS information may be configured in the executing entity in step S501 by its corresponding service provider, e.g., by an operator that provides the executing entity, or by a third party that provides the executing entity according to agreements between the third party and the operator.

In an exemplary embodiment, the executing entity may be an NRM server, and the requesting entity may be a VAL server. In this exemplary embodiment, the method 500 may be applied to the exemplary signaling sequence diagram of a VAL service communication procedure over a pre-established or dynamically established MBMS bearer as respectively shown in FIG. 6a and FIG. 6b, which will be described in detail later.

In this exemplary embodiment, the request message is a message for requesting an MBMS bearer, e.g., an MBMS Bearers Request message, that is transmitted from the VAL server to the NRM server via an API provided by the NRM sever, e.g., an SS_NetworkResourceAdaptation API.

Preferably, the request message may further includes at least one of:

a VAL service ID indicating a VAL service identifier that the MBMS bearer is requested for;

a requester ID indicating an identity of the VAL server that transmits the message, or a VAL group ID indicating an identity of a group that the MBMS bearer is requested for.

Accordingly, the method 500 may further include such steps (not shown) that the NRM server selects the local MBMS information from the at least one piece of local MBMS information according to at least one of: the VAL service ID, requester ID, and the VAL group ID; and uses the selected local MBMS information for activating an MBMS bearer (pre-established or dynamically established).

In an exemplary embodiment, the local MBMS information may include at least one of:

MB2-U information, xMB-U information, or

M1 interface information.

In another exemplary embodiment, the requesting entity may be an application specific server, and the executing entity may be a VAL server. In this exemplary embodiment, the method 500 may be applied to the exemplary signaling sequence diagram of a file delivery procedure over an MBMS bearer as shown in FIG. 7, which will be described in detail later.

In this exemplary embodiment, the request message is a message for requesting file distribution, e.g., a File Distribution Request message, that is transmitted from the application specific server to the VAL server via an API provided by the VAL server, e.g., a VAE_FileDistribution API.

In an exemplary embodiment, the indication may be replaced with local MBMS information configured in the application specific server.

That is, the request message from the application specific server to the VAL server may include either local MBMS information configured in the application specific server or an indication of using local MBMS information configured in the VAL server.

Thus, the VAL server may receive the local MBMS information configured in the application specific server directly in the message for requesting file distribution from the application specific server for the VAL server to use the local MBMS information for file distribution.

Alternatively, the VAL server may also receive the indication of using local MBMS information configured in the VAL server in the message for requesting file distribution from the application specific server, so that the VAL server may use the local MBMS information configured by itself for file distribution.

In an exemplary embodiment, the local MBMS information includes at least one of:

xMB-U information, or

M1 interface information.

Hereinafter, an exemplary signaling sequence diagram of a VAL service communication procedure over a pre-established MBMS bearer will be described with reference to FIG. 6a, in which the method 400 at the requesting entity (e.g., the VAL server) for local MBMS based MBMS data delivery and the method 500 at the executing entity (e.g., the NRM server) for local MBMS based MBMS data delivery according to exemplary embodiments of the present disclosure are applied.

It should be noted that the description below mainly focuses on signaling related to the methods 400 and 500, and some other signaling is not described in detail to avoid obscuring the principle of the present disclosure. In FIG. 6a, modification on the signaling related to the methods 400 and 500 is shown in Bold Italics, in which Signaling S6a_1, S6a_2a, and S6a_2b are involved.

Figure 6A:
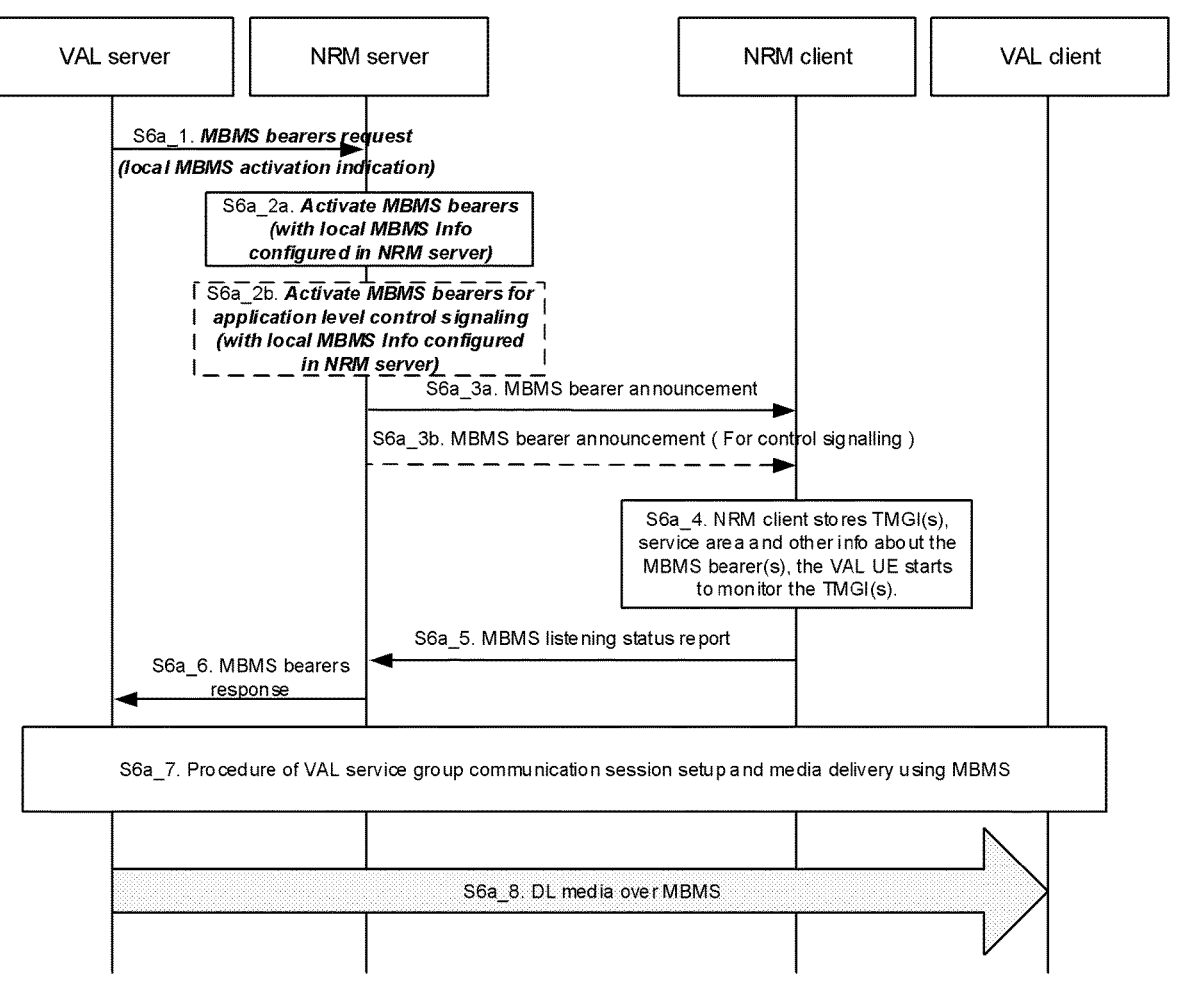
FIG. 6a schematically shows an exemplary signaling sequence diagram of a VAL service communication procedure over a pre-established MBMS bearer, in which methods for local MBMS based MBMS data delivery according to exemplary embodiments of the present disclosure are applied.

The exemplary procedure as shown in FIG. 6a relates to modifications on e.g., clause 14.3.4.2.2 in 3GPP TS 23.434 v16.4.0.

The exemplary procedure as shown in FIG. 6a shows only one of the receiving VAL clients using a pre-established MBMS bearer. There might also be a plurality of VAL clients in the same VAL service group communication session that receive the communication on unicast bearers.

In Signaling S6a_1, the VAL server sends an MBMS Bearers Request message to the NRM server, which corresponds to step S403 in method 400 and step S503 in method 500 as previously described. The MBMS Bearers Request message includes service description(s) for which the MBMS bearers are requested.

An exemplary information flow for MBMS Bearers Request from the VAL server to the NRM server according to the exemplary embodiment of the present disclosure is shown in Table 2 below, in which the newly added local MBMS parameters are shown as underlined text in Bold.

TABLE 2

| Exemplary MBMS Bearers Request of Present Disclosure | | |
|---|---|---|
| Information element | Status | Description |
| Requester Identity | M | The identity of the VAL server performing the request. |
| VAL group ID | M | The identity of the group that the MBMS bearer is requested for. |
| Service announcement mode | M | Indicates whether the request is sent by NRM server or by the VAL server |
| QoS | M | Indicates the requested QoS for the bearer |
| Broadcast area | O | Indicate the area where the MBMS bearer is requested for |
| Endpoint information | M | Information of the endpoint of the VAL server to which the user plane notifications have to be sent. |
| VAL service ID | O | Indicates the VAL service identifier that the MBMS bearer is requested for. |
| Local MBMS information (NOTE) | O | |
| > MB2-U information | O | IP address, UDP port number of the MB2-U interface |
| > xMB-U information | O | IP address, UDP port number of the xMB-U interface |
| > M1 interface information | O | M1 interface information for local MBMS |
| Local MBMS activation indication (NOTE) | O | Indicates whether to request the NRM server to use Local MBMS information. |

NOTE:
The VAL server may provide either the Local MBMS information or the Local MBMS activation indication.

In this exemplary embodiment, the VAL service ID and the local MBMS activation indication are especially included in the MBMS Bearers Request message.

In Signaling S6a_2a, the NRM server determines to activate the pre-established MBMS bearer(s). The activation of the pre-established MBMS bearer(s) in e.g., Evolved Packet System (EPS) is done on the MB2-C reference point and according to 3GPP TS 23.468 v16.0.0. This bearer will be used for the VAL service communication. In response to the local MBMS request in Signaling S6a_1, the NRM server uses its own configuration of local MBMS (i.e., the local MBMS information configured in the NRM server) based on the local MBMS activation indication to activate the pre-established MBMS bearers, which aligns with the procedure of Local MBMS based MBMS data delivery defined in 3GPP TS 23.285 v16.3.0.

Optionally, in Signaling S6a_2b, the NRM server may also activate a pre-established MBMS bearer dedicated for application level control signalling. The activation of the pre-established MBMS bearer is done on MB2-C reference point and according to 3GPP TS 23.468 v16.0.0. In response to the local MBMS request in Signaling S6a_1, the NRM server uses its own configuration of local MBMS (i.e., the local MBMS information configured in the NRM server) based on the local MBMS activation indication to activate the pre-established MBMS bearers, which aligns with the procedure of Local MBMS based MBMS data delivery defined in 3GPP TS 23.285 v16.3.0.

The local MBMS information in the NRM server may be different based on VAL requester identity, VAL group ID and/or VAL service ID. Thus, the local MBMS information used for activating the pre-established MBMS bearer may be selected by the NRM server from the at least one piece of local MBMS information according to at least one of: the VAL service ID, requester ID, and the VAL group ID, as previously described.

It should be noted that the procedure to determine the activation of pre-established MBMS bearers is implementation specific.

In Signaling S6a_3a, the NRM server passes the MBMS bearer information for the service description associated with the pre-established MBMS bearer to the NRM client. The NRM client obtains the Temporary Mobile Group Identity (TMGI) identifying the MBMS bearer from the service description.

In Signaling S6a_3b, the NRM server may pass the MBMS bearer information for the service description associated with the application control MBMS bearer to the NRM client. The NRM client obtains the TMGI identifying the MBMS bearer from the service description.

It should be noted that Signaling S6a_3a and S6a_3b may be done in one MBMS bearer announcement message.

In Signaling S6a_4, the NRM client stores the information associated with the TMGI(s). The NRM service client uses the TMGI and other MBMS bearer related information to activate the monitoring of the pre-established MBMS bearer by the VAL UE. The NRM client shares the MBMS bearer related information with the VAL client.

In Signaling S6a_5, the NRM client that enters or is in the service area of at least one announced TMGI indicates to the NRM server that the VAL UE is able to receive VAL service communication over MBMS, whereby the NRM server may decide to use the pre-established MBMS bearer instead of unicast bearer for VAL service communication sessions.

It should be noted that Signaling S6a_5 is optional for the VAL UE on subsequent MBMS bearer announcements.

In Signaling S6a_6, the NRM server provides an MBMS Bearers Response message to the VAL server.

In Signaling S6a_7, a VAL service group communication session is established.

In Signaling S6a_8, as the VAL server transmits the VAL service communication over the pre-established MBMS bearer, the VAL service communication packets are detected and delivered to the VAL client.

Figure 6B:
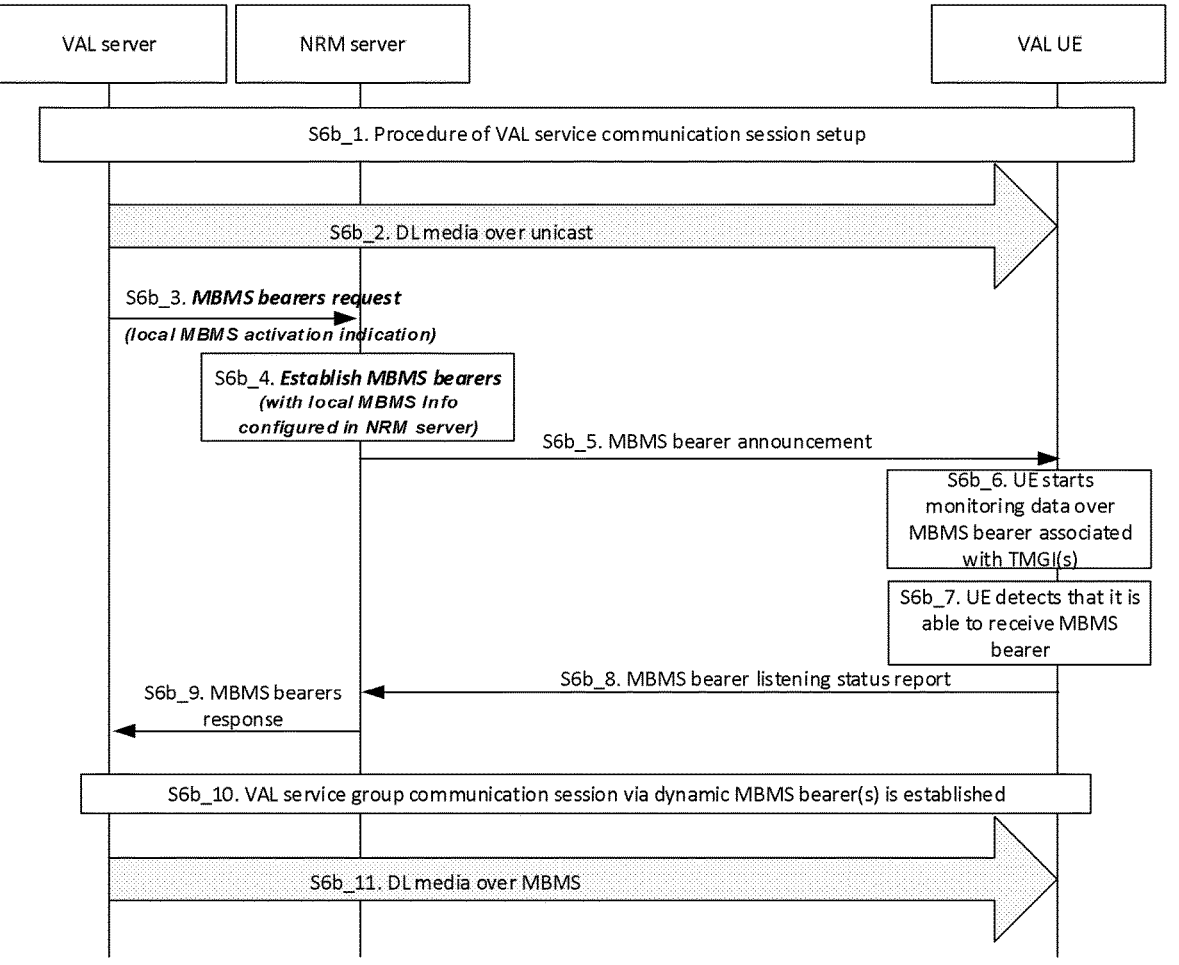
FIG. 6b schematically shows an exemplary signaling sequence diagram of a VAL service communication procedure over a dynamically established MBMS bearer, in which methods for local MBMS based MBMS data delivery according to exemplary embodiments of the present disclosure are applied.

The method 400 at the requesting entity (e.g., the VAL server) for local MBMS based MBMS data delivery and the method 500 at the executing entity (e.g., the NRM server) for local MBMS based MBMS data delivery according to exemplary embodiments of the present disclosure may also be applied in a VAL service communication procedure over a dynamically established MBMS bearer. FIG. 6b schematically shows such an exemplary signaling sequence diagram of a VAL service communication procedure over a dynamically established MBMS bearer, in which the MBMS Bearers Request message itself and the transmission of the MBMS Bearers Request message between the VAL server and the NRM server are identical with those that have been described with reference to FIG. 6a, and thus the detailed description of which may refer to those described in conjunction with FIG. 6a.

It should be noted that the description below mainly focuses on signaling related to the methods 400 and 500, and some other signaling is not described in detail to avoid obscuring the principle of the present disclosure. In FIG. 6b, modification on the signaling related to the methods 400 and 500 is shown in Bold Italics, in which Signaling S6b_3 and S6b_4 are involved.

The exemplary procedure as shown in FIG. 6b relates to modifications on e.g., clause 14.3.4.3.2 in 3GPP TS 23.434 v16.4.0.

In Signaling S6b_1, a VAL service group communication session is established.

In Signaling S6b_2, downlink (DL) data is sent by unicast delivery.

In Signaling S6b_3, the VAL server sends an MBMS Bearers Request message to the NRM server, which corresponds to step S403 in method 400 and step S503 in method 500 as previously described. The MBMS Bearers Request message includes service description(s) for which the MBMS bearers are requested, which may also be shown in Table 2 as previously described.

In Signaling S6b_4, the NRM server establishes the MBMS bearer(s) for the VAL service group communication session according to the procedures defined in 3GPP TS 23.468 v16.0.0. Service description associated with the MBMS bearer(s) is returned from the BM-SC. In response to the local MBMS request in Signaling S6b_3, the NRM server uses its own configuration of local MBMS (i.e., the local MBMS information configured in the NRM server) based on the local MBMS activation indication to activate the dynamically established MBMS bearers, which aligns with the procedure of Local MBMS based MBMS data delivery defined in 3GPP TS 23.285 v16.3.0.

In Signaling S6b_5, the NRM server provides service description information associated with the MBMS bearer to the UE. The VAL UE obtains the TMGI from the announcement message. This message may be sent on an application level control signalling bearer.

In Signaling S6b_6, the VAL UE starts monitoring data over the MBMS bearer associated with the TMGI, while in the service area associated with the TMGI.

In Signaling S6b_7, the VAL UE detects that it is able to receive data over the MBMS bearer associated with the TMGI.

In Signaling S6b_8, the NRM client notifies the NRM server the MBMS listening status associated to the monitored TMGI, (e.g. that it is successfully receiving the TMGI). The NRM client may also notify the MBMS reception quality level of the TMGI.

In Signaling S6b_9, the NRM server provides an MBMS bearer response to the VAL server with the dynamic MBMS bearer(s) information. The VAL server stops sending VAL service communication data over unicast way to the VAL client.

It should be noted that the MBMS reception quality level may be used by the NRM server to make an efficient decision to switch again to a unicast transmission or to take measures to prepare such a switch (e.g. when the quality level indicates that the reception quality of the MBMS bearer is decreasing or reaching an insufficient quality level for the reception of VAL services).

In Signaling S6b_10, a VAL service group communication session via dynamic MBMS bearer(s) is established.

In Signaling S6b_11, the VAL server sends the DL VAL service communication for the VAL service group communication session over the MBMS.

The above embodiments of the present disclosure described in conjunction with FIG. 6a and FIG. 6b enable the use of local MBMS in the NRM service provided by the SEAL NRM server. The impacted service API is e.g., SS_NetworkResourceAdaptation in 3GPP TS 23.434 v16.4.0.

Hereinafter, an exemplary signaling sequence diagram of a file delivery procedure over an MBMS bearer will be described with reference to FIG. 7, in which the method 400 at the requesting entity (e.g., the application specific server) for local MBMS and the method 500 at the executing entity (e.g., the VAL server) for local MBMS according to exemplary embodiments of the present disclosure are applied.

It should be noted that the description below mainly focuses on signaling related to the methods 400 and 500, and some other signaling is not described in detail to avoid obscuring the principle of the present disclosure. In FIG. 7, modification on the signaling related to the methods 400 and 500 is shown in Bold Italics, in which Signaling S7_1 and S7_2 are involved.

The exemplary procedure as shown in FIG. 7 relates to modifications on e.g., clause 9.5.2 in 3GPP TS 23.286 v16.3.0. In particular, some local MBMS related parameters are added in use of MBMS file session type procedure as defined in clause 9.5.2 of 3GPP TS 23.286 v16.3.0.

In the exemplary procedure as shown in FIG. 7, the VAL server may be represented by e.g. a VAE server, and the application specific server may be a V2X application specific server.

The VAE server acts as a content provider, and the VAE client acts as an MBMS client in the xMB reference model (see subclause 4.1 in 3GPP TS 26.348 v16.3.0).

The VAE server makes use of the xMB procedures from 3GPP TS 26.348 v16.3.0 to create MBMS sessions whose type is set to "files" and to request the delivery of files over these sessions. Before provisioning files to the BM-SC, the VAE server prepares the file for distribution, which may include partition of large files into smaller files or encryption.

The VAE server is responsible for translating the parameters related to the V2X application triggering the file delivery into corresponding xMB parameters. Table 3 below describes exemplary mapping between the V2X parameters and the xMB API properties specified in 3GPP TS 26.348 v16.3.0, in which the newly added local MBMS parameters are shown as underlined text in Bold.

TABLE 3

Exemplary Mapping between V2X parameters and xMB APIs

| V2X parameter | Corresponding xMB API property |
|---|---|
| File transfer session indicator | Session Type: Files |
| List of files to be sent by the VAE server and their locations | File List |
| Target geographical area for the V2X Ues | Geographical Area |
| Information about the V2X application (e.g., software update, HD map download) | Service Class |
| Maximum bitrate for the V2X application | Max Bitrate |
| Maximum delay for the V2X application | Max Delay |

TABLE 3-continued

Exemplary Mapping between V2X parameters and xMB APIs

| V2X parameter | Corresponding xMB API property |
|---|---|
| QoE metrics the VAE server is interested in receiving about the V2X application | QoE Reporting |
| Local MBMS information or local MBMS activation indication (NOTE) | Local MBMS information |

NOTE:
V2X application specific layer may provide VAE server either the local MBMS information or an indication of using local MBMS information configured in the VAE server. The local MBMS information includes M1 information and xMB-U information.

It should be noted that the list of V2X parameters needed for file delivery is not exhaustive and can be updated based on the specific V2X application requirements.

As shown in FIG. 7, in Signaling S7_1, the V2X application specific server transmits, to the VAE server, a File Distribution Request message that includes either local MBMS information configured in the V2X application specific server or local MBMS activation indication of using local MBMS information configured in the VAE server, which corresponds to step S403 in method 400 and step S503 in method 500 as previously described.

In Signaling S7_2, the VAE server uses the local MBMS information received from the V2X application specific server or the local MBMS information configured by itself to interact with the BM-SC for file distribution.

In Signaling S7_3, the VAE server transmits a File Distribution Response message to the V2X application specific server.

FIG. 7 exemplarily depicts the flow of how file distribution service is impacted, wherein the "File Distribution Request/Response" corresponds to the VAE_FileDistribution API as defined in TS 23.286 v16.3.0.

It should be noted that in the technical solutions of the exemplary embodiments of present disclosure as described above, the local MBMS information (e.g., the M1 information and xMB/MB2-U information) may be pre-configured in the VAE server or the NRM server by its corresponding service provider either by the operator (if the operator owns VAE or NRM server), or by the third party according to agreement with operator (if the third party owns the VAE or NRM server).

Figure 8:
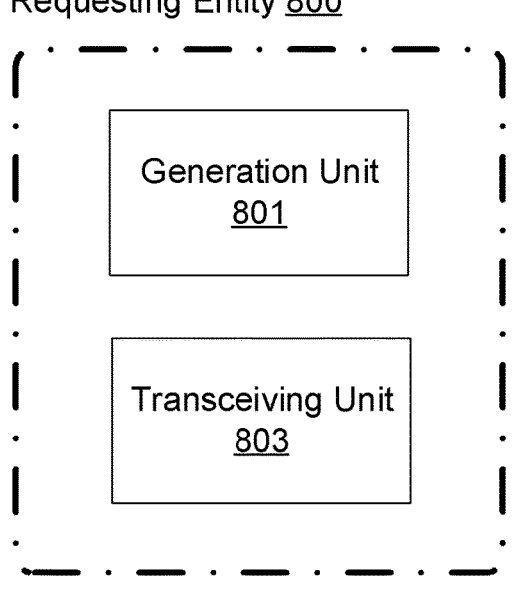
FIG. 8 schematically shows a structural block diagram of a requesting entity according to an exemplary embodiment of the present disclosure.

Hereinafter, a structure of a requesting entity according to an exemplary embodiment of the present disclosure will be described with reference to FIG. 8. FIG. 8 schematically shows a block diagram of a requesting entity 800 according to an exemplary embodiment of the present disclosure. The requesting entity 800 in FIG. 8 may perform the method 400 as described previously with reference to FIG. 4. Accordingly, some detailed description on the requesting entity 800 may refer to the corresponding description of the method 400 in FIG. 4 and the signaling sequence diagrams of FIGS. 6a and 6b and FIG. 7 as previously discussed, and thus will be omitted here for simplicity.

As shown in FIG. 8, the requesting entity 800 includes a generation unit 801 and a transceiving unit 803.

The generation unit 801 generates a request message that includes an indication of using local MBMS information configured in an executing entity.

Then, the transceiving unit 803 transmits the request message to the executing entity.

Here, the requesting entity and the executing entity may be included in the same application server or distributed.

In an exemplary embodiment, at least one piece of local MBMS information is configured in the executing entity.

In an exemplary embodiment, the requesting entity is a VAL server, and the executing entity is an NRM server; and the request message is a message for requesting an MBMS bearer that is transmitted from the VAL server to the NRM server via an API provided by the NRM sever.

In an exemplary embodiment, the request message further includes at least one of:

a VAL service ID indicating a VAL service identifier that the MBMS bearer is requested for, a requester ID indicating an identity of the VAL server that transmits the message, or a VAL group ID indicating an identity of a group that the MBMS bearer is requested for.

In an exemplary embodiment, the local MBMS information is selected from the at least one piece of local MBMS information according to at least one of: the VAL service ID, requester ID, and the VAL group ID.

In an exemplary embodiment, the local MBMS information includes at least one of:

MB2-U information, xMB-U information, or

M1 interface information.

In an exemplary embodiment, the requesting entity is an application specific server, and the executing entity is a VAL server; and the request message is a message for requesting file distribution that is transmitted from the application specific server to the VAL server via an API provided by the VAL server.

In an exemplary embodiment, the VAL server includes a VAE server.

In an exemplary embodiment, the indication is replaced with local MBMS information configured in the application specific server.

In an exemplary embodiment, the local MBMS information includes at least one of:

xMB-U information, or

M1 interface information.

Figure 9:
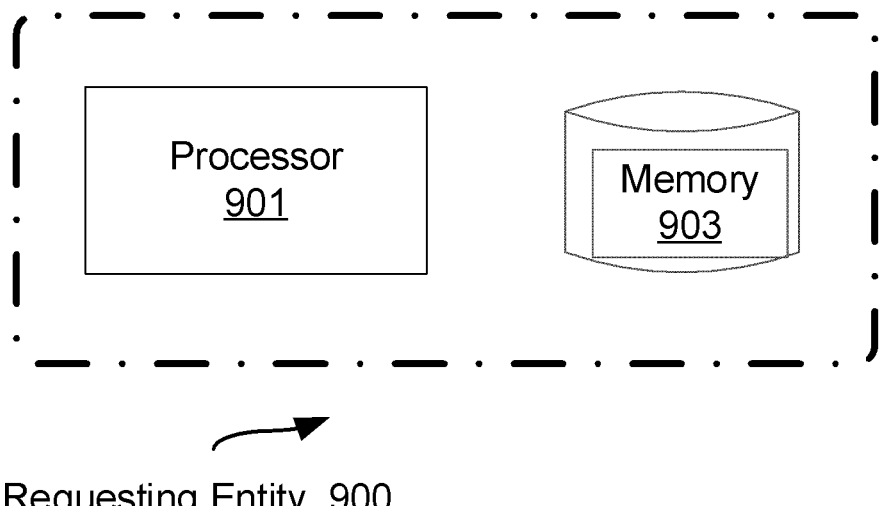
FIG. 9 schematically shows a structural block diagram of a requesting entity according to another exemplary embodiment of the present disclosure.

Hereinafter, a structure of a requesting entity according to another exemplary embodiment of the present disclosure will be described with reference to FIG. 9. FIG. 9 schematically shows a block diagram of a requesting entity 900 according to an exemplary embodiment of the present disclosure. The requesting entity 900 in FIG. 9 may perform the method 400 as described previously with reference to FIG. 4. Accordingly, some detailed description on the requesting entity 900 may refer to the corresponding description of the method 400 in FIG. 4 and the signaling sequence diagrams of FIGS. 6a and 6b and FIG. 7 as previously discussed, and thus will be omitted here for simplicity.

As shown in FIG. 9, the requesting entity 900 includes at least one processor 901 and at least one memory 903. The at least one processor 901 includes e.g., any suitable CPU (Central Processing Unit), microcontroller, DSP (Digital Signal Processor), etc., capable of executing computer program instructions. The at least one memory 903 may be any combination of a RAM (Random Access Memory) and a ROM (Read Only Memory). The at least one processor memory 903 may also include persistent storage, which, for example, can be any single one or combination of magnetic memory, optical memory, or solid state memory or even remotely mounted memory.

The at least one memory 903 stores instructions executable by the at least one processor 901. The instructions, when loaded from the at least one memory 903 and executed on the at least one processor 901, may cause the requesting entity 900 to perform the actions, e.g., of the procedures as described earlier respectively in conjunction with FIG. 4 with reference to the signaling sequence diagrams of FIGS. 6a and 6b and FIG. 7 as previously discussed, and thus will be omitted here for simplicity.

Figure 10:
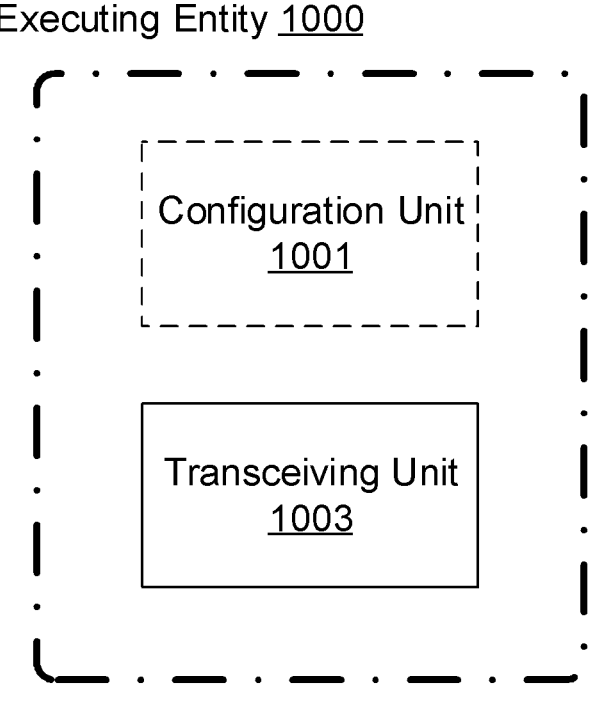
FIG. 10 schematically shows a structural block diagram of an executing entity according to an exemplary embodiment of the present disclosure.

Hereinafter, a structure of an executing entity according to an exemplary embodiment of the present disclosure will be described with reference to FIG. 10. FIG. 10 schematically shows a block diagram of an executing entity 1000 according to an exemplary embodiment of the present disclosure. The executing entity 1000 in FIG. 10 may perform the method 500 as described previously with reference to FIG. 5. Accordingly, some detailed description on the executing entity 1000 may refer to the corresponding description of the method 500 in FIG. 5 and the signaling sequence diagram of FIGS. 6a and 6b and FIG. 7 as previously discussed, and thus will be omitted here for simplicity.

As shown in FIG. 10, the executing entity 1000 includes a transceiving unit 1003.

The transceiving unit 1003 receives, from a requesting entity, a request message that includes an indication of using local MBMS information configured in the executing entity.

In an exemplary embodiment, the executing entity 1000 may further includes a configuration unit 1001, which may configure at least one piece of local MBMS information by its corresponding service provider, e.g., by an operator that provides the executing entity, or by a third party that provides the executing entity according to agreements between the third party and the operator.

In an exemplary embodiment, the requesting entity is a VAL server, and the executing entity is an NRM server; and the request message is a message for requesting an MBMS bearer that is received from the NRM server to the VAL server via an API.

In an exemplary embodiment, the request message further includes at least one of:

a VAL service ID indicating a VAL service identifier that the MBMS bearer is requested for, a requester ID indicating an identity of the VAL server that transmits the message, or a VAL group ID indicating an identity of a group that the MBMS bearer is requested for.

In an exemplary embodiment, the executing entity 1000 further includes a selection unit (not shown), which may select the local MBMS information from the at least one piece of local MBMS information according to at least one of: the VAL service ID, requester ID, and the VAL group ID. The executing entity 1000 further includes a performing unit (not shown), which may use the selected local MBMS information for activating an MBMS bearer.

In an exemplary embodiment, the local MBMS information includes at least one of:

MB2-U information, xMB-U information, or

M1 interface information.

In an exemplary embodiment, the requesting entity is an application specific server, and the executing entity is a VAL server; and the request message is a message for requesting file distribution that is transmitted from the application specific server to the VAL server via an API provided by the VAL server.

In an exemplary embodiment, the VAL server includes a VAE server.

In an exemplary embodiment, the indication is replaced with local MBMS information configured in the application specific server, and the performing unit may use the received local MBMS information for file distribution.

In an exemplary embodiment, the local MBMS information includes at least one of:

xMB-U information, or

M1 interface information.

Figure 11:
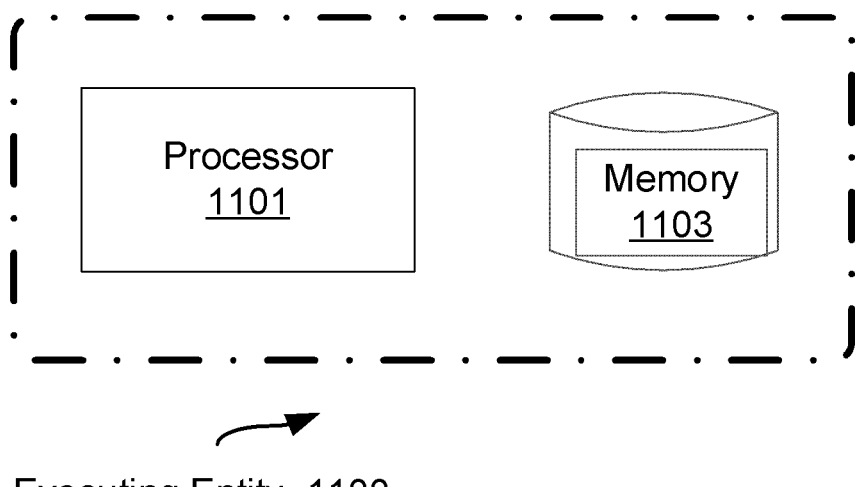
FIG. 11 schematically shows a structural block diagram of an executing entity according to another exemplary embodiment of the present disclosure.

Hereinafter, a structure of an executing entity according to another exemplary embodiment of the present disclosure will be described with reference to FIG. 11. FIG. 11 schematically shows a block diagram of an executing entity 1100 according to an exemplary embodiment of the present disclosure. The executing entity 1100 in FIG. 11 may perform the method 500 as described previously with reference to FIG. 5. Accordingly, some detailed description on the executing entity 1100 may refer to the corresponding description of the method 500 in FIG. 5 and the signaling sequence diagram of FIGS. 6a and 6b and FIG. 7 as previously discussed, and thus will be omitted here for simplicity.

As shown in FIG. 11, the executing entity 1100 includes at least one processor 1101 and at least one memory 1103. The at least one processor 1101 includes e.g., any suitable CPU (Central Processing Unit), microcontroller, DSP (Digital Signal Processor), etc., capable of executing computer program instructions. The at least one memory 1103 may be any combination of a RAM (Random Access Memory) and a ROM (Read Only Memory). The at least one processor memory 1103 may also include persistent storage, which, for example, can be any single one or combination of magnetic memory, optical memory, or solid state memory or even remotely mounted memory.

The at least one memory 1103 stores instructions executable by the at least one processor 1101. The instructions, when loaded from the at least one memory 1103 and executed on the at least one processor 1101, may cause the executing entity 1100 to perform the actions, e.g., of the procedures as described earlier respectively in conjunction with FIG. 5 with reference to the signaling sequence diagrams of FIGS. 6a and 6b and FIG. 7 as previously discussed, and thus will be omitted here for simplicity.

Figure 12:
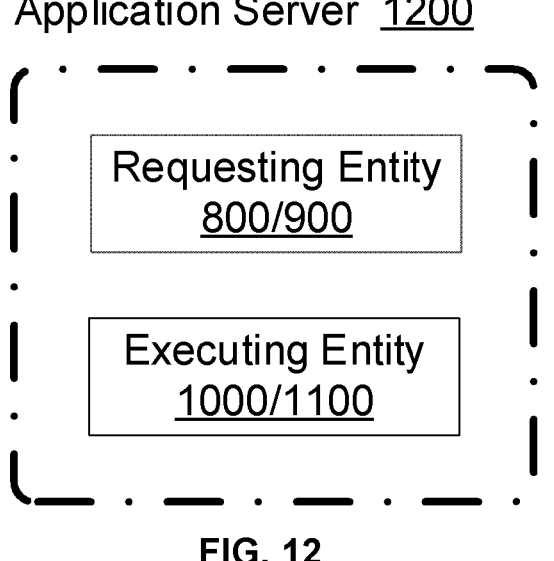
FIG. 12 schematically shows a structural block diagram of an application server according to an exemplary embodiment of the present disclosure.

The present disclosure also provides an application server. FIG. 12 schematically shows a structural block diagram of an application server according to an exemplary embodiment of the present disclosure. As shown in FIG. 12, the application server 1200 may include: at least one requesting entity 800/900 according to the exemplary embodiments of the present disclosure as described above, and at least one executing entity 1000/1100 according to the exemplary embodiments of the present disclosure as described above.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 901 causes the requesting entity 900 to perform the actions, e.g., of the procedure described earlier in conjunction with FIG. 4; or code/computer readable instructions, which when executed by the at least one processor 1101 causes the executing entity 1100 to perform the actions, e.g., of the procedures described earlier respectively in conjunction with FIG. 5.

The computer program product may be configured as a computer program code structured in computer program modules. The computer program modules could essentially perform the actions of the flow illustrated in any of FIGS. 4 to 7.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method at a requesting entity, comprising:

generating a request message for activation of a Multimedia Broadcast Multicast Service (MBMS) bearer; and transmitting the request message to an executing entity, wherein the requesting entity and the executing entity are comprised in an application server, and the request message for the activation of the MBMS bearer comprises an indication indicating that the executing entity shall use local MBMS information configured in the executing entity to activate the MBMS bearer.

2. The method of claim 1, wherein at least one piece of local MBMS information is configured in the executing entity.

3. The method of claim 2, wherein the requesting entity is a Vertical Application Layer (VAL) server, and the executing entity is a Network Resource Management (NRM) server; and the request message is transmitted from the VAL server to the NRM server via an application programming interface (API) provided by the NRM sever.

4. The method of claim 3, wherein the request message further comprises at least one of:

a VAL service ID indicating a VAL service identifier that the MBMS bearer is requested for, a requester ID indicating an identity of the VAL server that transmits the message, or a VAL group ID indicating an identity of a group that the MBMS bearer is requested for.

5. The method of claim 4, wherein the local MBMS information is selected from the at least one piece of local MBMS information according to at least one of: the VAL service ID, requester ID, and the VAL group ID.

6. The method of claim 3, wherein the local MBMS information comprises at least one of:

MB2-U information, xMB-U information, or

M1 interface information.

7. The method of claim 1, wherein the requesting entity is an application specific server, and the executing entity is a Vertical Application Layer (VAL) server; and the request message is a message for requesting file distribution that is transmitted from the application specific server to the VAL server via an application programming interface (API) provided by the VAL server.

8. The method of claim 7, wherein the VAL server comprises a Vehicle-to-Everything Application Enabler 'VAE' server.

9. The method of claim 7, wherein the indication is replaced with local MBMS information configured in the application specific server.

10. The method of claim 7, wherein the local MBMS information comprises at least one of:

xMB-U information, or

M1 interface information.

11. A non-transitory computer readable storage medium storing a computer program for configuring an apparatus to perform the method of claim 1.

12. A method performed by an executing entity, comprising:

receiving, from a requesting entity, a request message for activation of a Multimedia Broadcast Multicast Service (MBMS) bearer, wherein the request message comprises an indication indicating that the executing entity shall use local MBMS information configured in the executing entity to activate the MBMS bearer; and after receiving the request message, activating the MBMS bearer using local MBMS information configured in the executing entity.

13. The method of claim 12, further comprising:

configuring at least one piece of local MBMS information.

14. The method of claim 13, wherein the requesting entity is a Vertical Application Layer (VAL) server, and the executing entity is a Network Resource Management (NRM) server; and the request message is received by the NRM server from the VAL server via an Application Programming Interface (API).

15. The method of claim 14, wherein the request message further comprises at least one of:

a VAL service ID indicating a VAL service identifier that the MBMS bearer is requested for, a requester ID indicating an identity of the VAL server that transmits the message, or a VAL group ID indicating an identity of a group that the MBMS bearer is requested for.

16. The method of claim 15, further comprising:

selecting the local MBMS information from the at least one piece of local MBMS information according to at least one of: the VAL service ID, requester ID, and the VAL group ID.

17. The method of claim 14, wherein the local MBMS information comprises at least one of:

MB2-U information, xMB-U information, or

M1 interface information.

18. The method of claim 12, wherein the requesting entity is an application specific server, and the executing entity is a Vertical Application Layer (VAL) server; and the request message is a message for requesting file distribution that is transmitted from the application specific server to the VAL server via an application programming interface (API) provided by the VAL server.

19. The method of claim 18, wherein the VAL server comprises a Vehicle-to-Everything Application Enabler server.

20. The method of claim 18, wherein the indication is replaced with local MBMS information configured in the application specific server, and the method further comprises:

using the received local MBMS information for file distribution.

21. The method of claim 18, wherein the local MBMS information comprises at least one of:

xMB-U information, or

M1 interface information.

22. A non-transitory computer readable storage medium storing a computer program for configuring an apparatus to perform the method of claim 12.

23. A requesting entity, comprising:

at least one processor, and at least one memory, storing instructions which, when executed on the at least one processor, cause the requesting entity to:

generate a request message for activation of a Multimedia Broadcast Multicast Service (MBMS) bearer; and transmit the request message to an executing entity, wherein the requesting entity and the executing entity are comprised in an application server, and the request message for the activation of the MBMS bearer comprises an indication indicating that the executing entity shall use local MBMS information configured in the executing entity to activate the MBMS bearer.

24. An executing entity, comprising:

at least one processor, and at least one memory, storing instructions which, when executed on the at least one processor, cause the executing entity to:

receive, from a requesting entity, a request message for activation of a Multimedia Broadcast Multicast Service (MBMS) bearer, wherein the request message comprises an indication indicating that the executing entity shall use local MBMS information configured in the executing entity to activate the MBMS bearer; and after receiving the request message, activate the MBMS bearer using local MBMS information configured in the executing entity.

* * * * *